(12) United States Patent
Weaver et al.

(10) Patent No.: US 8,950,488 B2
(45) Date of Patent: Feb. 10, 2015

(54) POLYMERIZING AND ANCHORING A WATER-SOLUBLE POLYMER TO AN IN-PLACE MINERAL SURFACE OF A WELL

(75) Inventors: Jimmie D. Weaver, Duncan, OK (US); Larry S. Eoff, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 470 days.

(21) Appl. No.: 12/835,579

(22) Filed: Jul. 13, 2010

(65) Prior Publication Data

US 2012/0012320 A1  Jan. 19, 2012

(51) Int. Cl.
  E21B 43/25 (2006.01)
  C09K 8/82 (2006.01)
  C09K 8/80 (2006.01)
  C09K 8/508 (2006.01)

(52) U.S. Cl.
  CPC .. *C09K 8/80* (2013.01); *C09K 8/508* (2013.01)
  USPC ....................................... 166/300; 166/305.1

(58) Field of Classification Search
  None
  See application file for complete search history.

(56) References Cited

U.S. PATENT DOCUMENTS

| | | | | |
|---|---|---|---|---|
| 2,633,919 A * | 4/1953 | Bauer et al. | .................. | 166/300 |
| 4,787,453 A * | 11/1988 | Hewgill et al. | ............ | 166/272.3 |
| 5,358,051 A | 10/1994 | Rodrigues | | |
| 6,109,350 A | 8/2000 | Nguyen | | |
| 6,476,169 B1 | 11/2002 | Eoff | | |
| 6,642,184 B1 * | 11/2003 | De Ridder | .................... | 507/233 |
| 6,978,836 B2 | 12/2005 | Nguyen | | |
| 7,964,539 B2 * | 6/2011 | Kotlar | .......................... | 507/233 |
| 2006/0065396 A1 * | 3/2006 | Dawson et al. | ............... | 166/279 |
| 2007/0181302 A1 * | 8/2007 | Bicerano | .................... | 166/280.2 |
| 2011/0017461 A1 * | 1/2011 | Aston et al. | ................... | 166/310 |

FOREIGN PATENT DOCUMENTS

EP  0933414 B1  4/2003

OTHER PUBLICATIONS

Barreau, Water Control in Producing Wells, SPE 10th Symposium on Improved Oil Recovery, Apr. 21-24, 1996, pp. 449-457.
EC Safety Data Sheet for Trimethoxy (Vinyl) Silane, Famas Technology, CAS No. 2768=02-7, Feb. 23, 2007.
Poss User's Guide, Version 2.06, Hybrid Plastics, Inc., Hattiesburg, MS.
Schwab, How POSS Chemicals Can Enhance Performance and Lead to Cost Savings, Hybrid Plastics, Inc, Oct. 2009.

* cited by examiner

*Primary Examiner* — Angela M DiTrani
(74) *Attorney, Agent, or Firm* — Holly Soehnge; Baker Botts L.L.P.

(57) ABSTRACT

Methods using an anchoring agent for a water-soluble polymer that is in-place polymerized in a subterranean formation. The anchoring agent comprises a hydrolyzable silyl group that reacts with one or more dangling hydroxyl groups of a mineral surface in the subterranean formation to form "hard" bonds, "anchoring" to the mineral surface. The anchoring agent is selected to have another functional group for covalent attachment to the water-soluble polymer. This can help a water-soluble polymer be anchored to a mineral surface in a subterranean formation. Accordingly, it is believed that monomolecular layers of water-soluble polymer will be formed and anchored to the mineral surface, which will provide excellent elastic properties to the matrix. The monomolecular layers are not expected to interfere with the permeability of the matrix.

4 Claims, 2 Drawing Sheets

POLYMERIZING AND ANCHORING A WATER-SOLUBLE POLYMER TO AN IN-PLACE MINERAL SURFACE OF A WELL

TECHNICAL FIELD

The present inventions relate to methods for consolidating an incompetent subterranean formation, the stabilization of fines, and the remedial treatment of proppant to help prevent proppant flow back during production from a well.

BACKGROUND

Oil and gas hydrocarbons are naturally occurring in some subterranean formations. A subterranean formation containing oil or gas sometimes is referred to as a reservoir. A reservoir may be located under land or off shore. Oil and gas reservoirs may be located in the range of a few hundred feet (shallow reservoirs) to a few tens of thousands of feet (ultra-deep reservoirs). In order to produce oil or gas, a well is drilled into a reservoir or into another subterranean formation in fluid communication with a reservoir.

In order to produce oil or gas, a well is drilled into a subterranean formation, which can be a reservoir or adjacent to a reservoir. As used herein, a "well" includes at least one wellbore drilled into a subterranean formation, which may be a reservoir or adjacent to a reservoir. A wellbore can have vertical and horizontal portions, and it can be straight, curved, or branched. As used herein, the term "wellbore" refers to a wellbore itself, including any uncased, openhole portion of the wellbore. As used herein, a "well" also includes the interior of a wellbore and a near-wellbore region. A near-wellbore region is the subterranean material and rock of a subterranean formation surrounding the wellbore. The near-wellbore region is the region within about 100 feet of the wellbore. As used herein, "into a well" means and includes into any portion of the well, including into the wellbore or into a portion of a near-wellbore region.

Various types of treatments commonly are performed on a well or subterranean formation. For example, stimulation is a type of treatment performed on a well or subterranean formation to restore or enhance the productivity of oil and gas from the well or subterranean formation. Stimulation treatments fall into two main groups: hydraulic fracturing and matrix treatments. Fracturing treatments are performed above the fracture pressure of the subterranean formation to create or extend a highly-permeable flow path between the formation and the wellbore. Matrix stimulation treatments include acid, solvent, and chemical treatments to improve the permeability of the near-wellbore formation, enhancing the productivity of a well. Matrix stimulation treatments are performed below the facture pressure of the subterranean formation. Other types of treatments include, for example, controlling excessive water production, relative permeability modification, consolidating an incompetent subterranean formation, the stabilization of fines, and the remedial treatment of proppant to help prevent proppant flow back during production from a well.

A treatment typically involves introducing a treatment fluid into a well. As used herein, a "treatment fluid" is a fluid used to resolve a specific condition of a wellbore or subterranean formation. As used herein, a "treatment fluid" also means the specific composition of a fluid at the time the fluid is being introduced into a wellbore. A treatment fluid is adapted to be used to resolve a specific purpose, such as stimulation, isolation, or control of reservoir gas or water. The word "treatment" in the term "treatment fluid" does not necessarily imply any particular action by the fluid.

As used herein, a fluid can be homogeneous or heterogeneous. An example of a heterogeneous fluid is a dispersion. Further, a treatment fluid can include a gas for foaming the fluid. As used herein, an "aqueous" fluid is a fluid that is either a homogeneous solution comprising water or a heterogeneous fluid wherein the external phase comprises water. As used herein, an "alcohol" fluid is a fluid that is either a homogeneous solution comprising alcohol or a heterogeneous fluid wherein the external phase comprises alcohol, and further wherein the alcohol is selected from the group consisting of alcohols having fewer than three carbon atoms. A fluid can be an aqueous-alcohol fluid.

A common stimulation treatment is "hydraulic fracturing," sometimes simply referred to as "fracturing." A treatment fluid adapted for this purpose sometimes is referred to as a "fracturing fluid." The fracturing fluid is pumped at a sufficiently high flow rate and pressure into the wellbore and into the subterranean formation to create or enhance a fracture in the subterranean formation. Creating a fracture means making a new fracture in the formation. Enhancing a fracture means enlarging a pre-existing fracture in the formation.

A newly-created or extended fracture will tend to close together after the pumping of the fracturing fluid is stopped. To prevent the fracture from closing, a material must be placed in the fracture to keep the fracture propped open. A material used for this purpose is referred to as a "proppant."

The proppant is in the form of a solid particulate, which can be suspended in the fracturing fluid, carried downhole, and deposited in the fracture as a "proppant pack." The proppant pack props the fracture in an open condition while allowing fluid flow through the permeability of the pack. A particulate for use as a proppant is selected based on the characteristics of size range, crush strength, and insolubility.

The proppant is an appropriate size to prop open the fracture and allow fluid to flow through the proppant pack, that is, in between and around the proppant making up the pack. Appropriate sizes of particulate for use as a proppant are typically in the range from about 8 to about 100 U.S. Standard Mesh. The proppant is sufficiently strong, that is, has a sufficient compressive or crush resistance, to prop the fracture open without being deformed or crushed by the closure stress of the fracture in the subterranean formation. Further, a suitable proppant should not dissolve in fluids commonly encountered in a well environment. Preferably, a material is selected that will not dissolve in water or crude oil. Suitable proppant materials include, but are not limited to, sand, ground nut shells or fruit pits, sintered bauxite, glass, plastics, ceramic materials, processed wood, resin coated sand or ground nut shells or fruit pits or other composites and any combination thereof in any proportion.

A problem with a fractured formation can be proppant flow back during production from the formation. Loss of proppant from a fracture is a leading cause of production decline. In addition, the flow back of proppant can damage production equipment.

Another common treatment is for the consolidation of an incompetent or unconsolidated subterranean formation. An incompetent formation is relatively ductile and tends to flow under stress rather than deform by brittle faulting or fracturing. An unconsolidated formation contains particulate matter capable of migrating with produced fluids out of the formation and into a wellbore. Unconsolidated portions of subterranean formations include those that contain loose particulates that are readily entrained by produced fluids and those wherein the particulates are bonded together with insufficient bond strength to withstand the forces produced by the production of fluids through the zones. The presence of particulate matter, such as sand, in produced fluids may be disadvantageous and undesirable in that such particulates may abrade pumping equipment and other producing equipment and may reduce the fluid production capabilities of the producing portions of the subterranean formation.

One method of controlling unconsolidated particulates involves placing a filtration bed of gravel near the wellbore in order to present a physical barrier to the transport of unconsolidated particulate matter with the production of hydrocarbons. Typically, such so-called "gravel packing operations" involve the pumping and placement of a quantity of a desired particulate into the unconsolidated formation adjacent to the wellbore. Such packs are time consuming and expensive to install.

Weakly consolidated formations also have been treated by creating fractures in the formations and depositing proppant in the fractures wherein the proppant is consolidated within the fractures into hard, permeable masses using a resin composition to reduce the migration of particulates. In some situations, the processes of fracturing and gravel packing are combined into a single treatment to stimulate hydrocarbon production while inhibiting particulate matter production with an annular gravel pack. Such treatments are referred to as "frac pack" operations.

Another method used to control formation particulates in unconsolidated formations involves consolidating a portion of a subterranean formation into a hard, permeable mass by applying a curable resin composition to the portion of the subterranean formation. An example of such a method includes preflushing the formation, applying a hardenable resin composition, applying a spacer fluid, applying an external catalyst to cause the resin to set, and applying an afterflush fluid to remove excess resin from the pore spaces of the zones. Such resin consolidation methods may be limited by the ability to place the resin through enough of the unconsolidated portion of the formation to control the particulates adequately. The compositions are often unable to achieve significant penetration or uniform penetration into the portion of the subterranean formation. Conditions such as variable formation permeability; formation damage in the near-wellbore area; debris along the wellbore, a perforation tunnel, or a fracture face; and, compaction zones along the wellbore, a perforation tunnel, or a fracture face may make uniform placement of resin compositions extremely difficult to achieve.

Water-soluble polymers have been used at high concentrations and cross-linked to build a 3-dimensional network. This results in plugging off flow channels, which can be used for water control. At lower concentrations, the materials are adsorbed onto the mineral surfaces resulting in changes in relative permeability of different fluids through the matrix. Most of the water-soluble polymers used for relative permeability modification tend to be produced back slowly. Often, ionic species are copolymerized into the water-soluble polymer, which makes the water-soluble polymer be attracted ionically to the mineral surfaces and helps decrease this wash-off tendency.

SUMMARY OF THE INVENTIONS

It has been observed that when the porosity of the matrix of a poorly-consolidated core sample is filled with a solution of a polymerizable monomer and polymerized while in the core at a high concentration, the core becomes consolidated, but not hard. This is because the resulting polymer is not hard, but rather flexible. For example, the use of one or more water-soluble vinyl monomers to form a water-soluble polymer is easy to perform using a free-radical initiator.

This invention utilizes an anchoring agent for a water-soluble polymer that is in-place polymerized in a subterranean formation. The anchoring agent comprises a hydrolyzable silyl group that reacts with one or more dangling hydroxyl groups of a mineral surface in the subterranean formation to form "hard" bonds, "anchoring" to the mineral surface. It is believed this is through covalent bonding to the mineral surface, which is much stronger than ionic bonding. The anchoring agent is selected to have another functional group for covalent attachment to the water-soluble polymer. This can help a water-soluble polymer be anchored to a mineral surface in a subterranean formation. Accordingly, it is believed that monomolecular layers of water-soluble polymer will be formed and anchored to the mineral surface, which will provide excellent elastic properties to the matrix. The monomolecular layers are not expected to interfere with the permeability of the matrix.

More particularly, according to one aspect of the inventions, a method of treating a portion of a well is provided, the method comprising the steps of:

(a) introducing a water-soluble monomer into the portion of the well, wherein the water-soluble monomer comprises a first polymerizable group, and wherein the water-soluble monomer is polymerizable to form a water-soluble polymer;

(b) introducing an anchoring agent into the portion of the well, wherein the anchoring agent comprises a hydrolyzable silyl group and a second polymerizable group, and wherein the first polymerizable group and the second polymerizable group are the same or different and are copolymerizable;

(c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;

(d) allowing or causing a second condition in the portion of the well that is at least sufficient for the first polymerizable group and the second polymerizable group to copolymerize; and (e) allowing or causing a third condition in the portion of the well that is at least sufficient for the first polymerizable group to polymerize;

wherein any two of the first condition, the second condition, and the third condition can be the same or different.

According to another aspect of the inventions, a method for treating a portion of a well is provided, the method comprising the steps of:

(a) introducing a water-soluble monomer into the portion of the well, wherein the water-soluble monomer comprises a polymerizable group, wherein the water-soluble monomer is polymerizable to form a water-soluble polymer, and wherein the water-soluble monomer comprises a first organo-reactive group;

(b) introducing an anchoring agent into the portion of the well, wherein the anchoring agent comprises a hydrolyzable silyl group and a second organo-reactive group, and wherein the first organo-reactive group and the second organo-reactive group are the same or different and are capable of being reacted with each other to form a covalent bond;

(c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;

(d) allowing or causing a second condition in the portion of the well that is at least sufficient for the first organo-reactive group and the second organo-reactive group to react with each other to form a covalent bond; and (e) allowing or causing third conditions in the portion of the well that are at least sufficient for the polymerizable group to polymerize;

wherein any two or three of the first condition, the second condition, and the third condition can be the same or different.

Other and further objects, features, and advantages of the present invention will be readily apparent to those skilled in the art when the following description of the preferred embodiments is read in conjunction with the accompanying drawings.

BRIEF DESCRIPTION OF THE DRAWING

The accompanying drawing is incorporated into the specification to help illustrate examples according to the presently most-preferred embodiment of an invention. The drawing is not to be construed as limiting an invention.

DETAILED DESCRIPTION OF THE PREFERRED EMBODIMENTS

Figure 1:
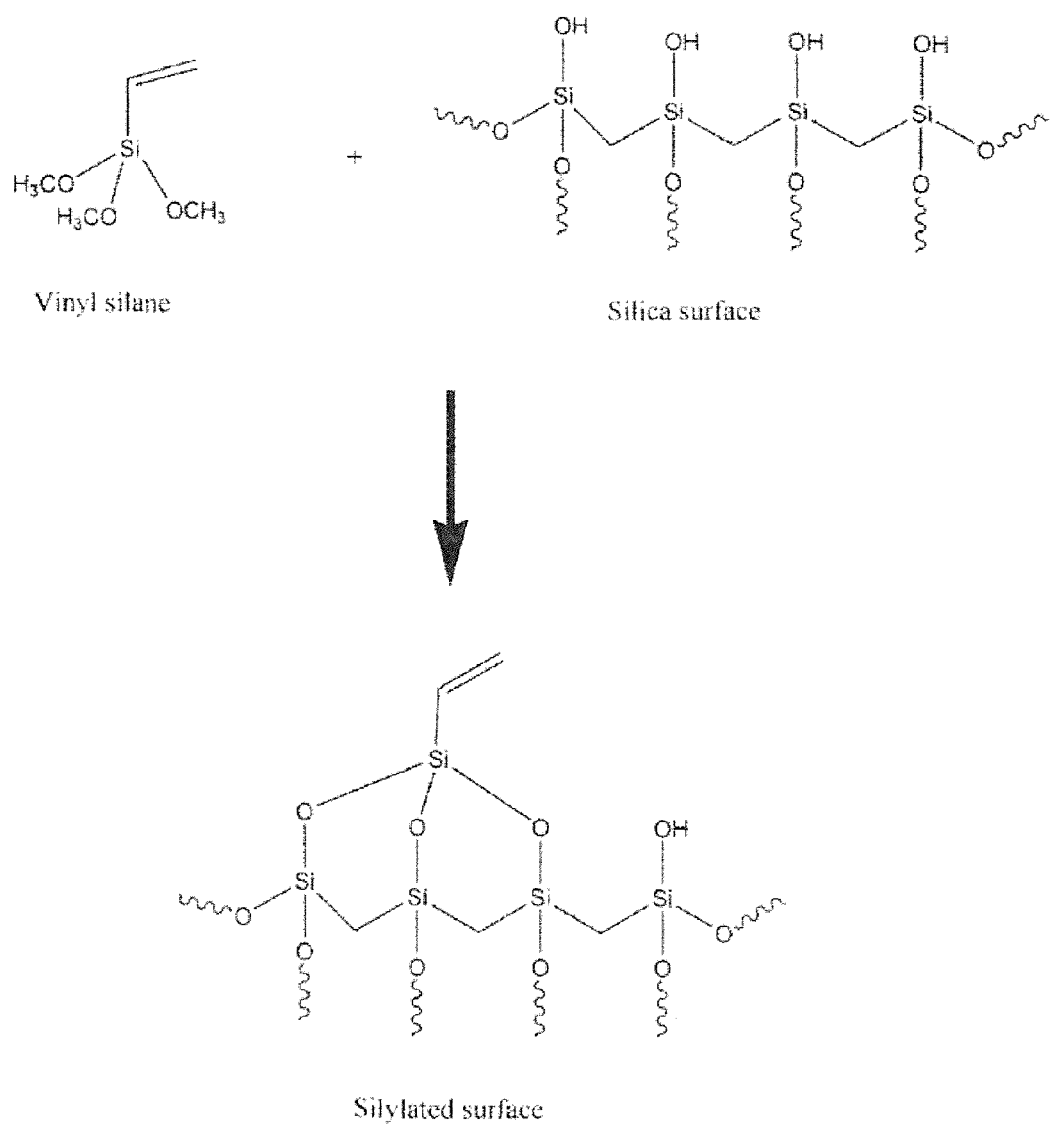
FIG. 1 is an example of a silylation of a silica surface having dangling hydroxide groups using a vinyl silane (for example, trimethoxy vinyl silane) to produce a silylated surface.
Figure 2:
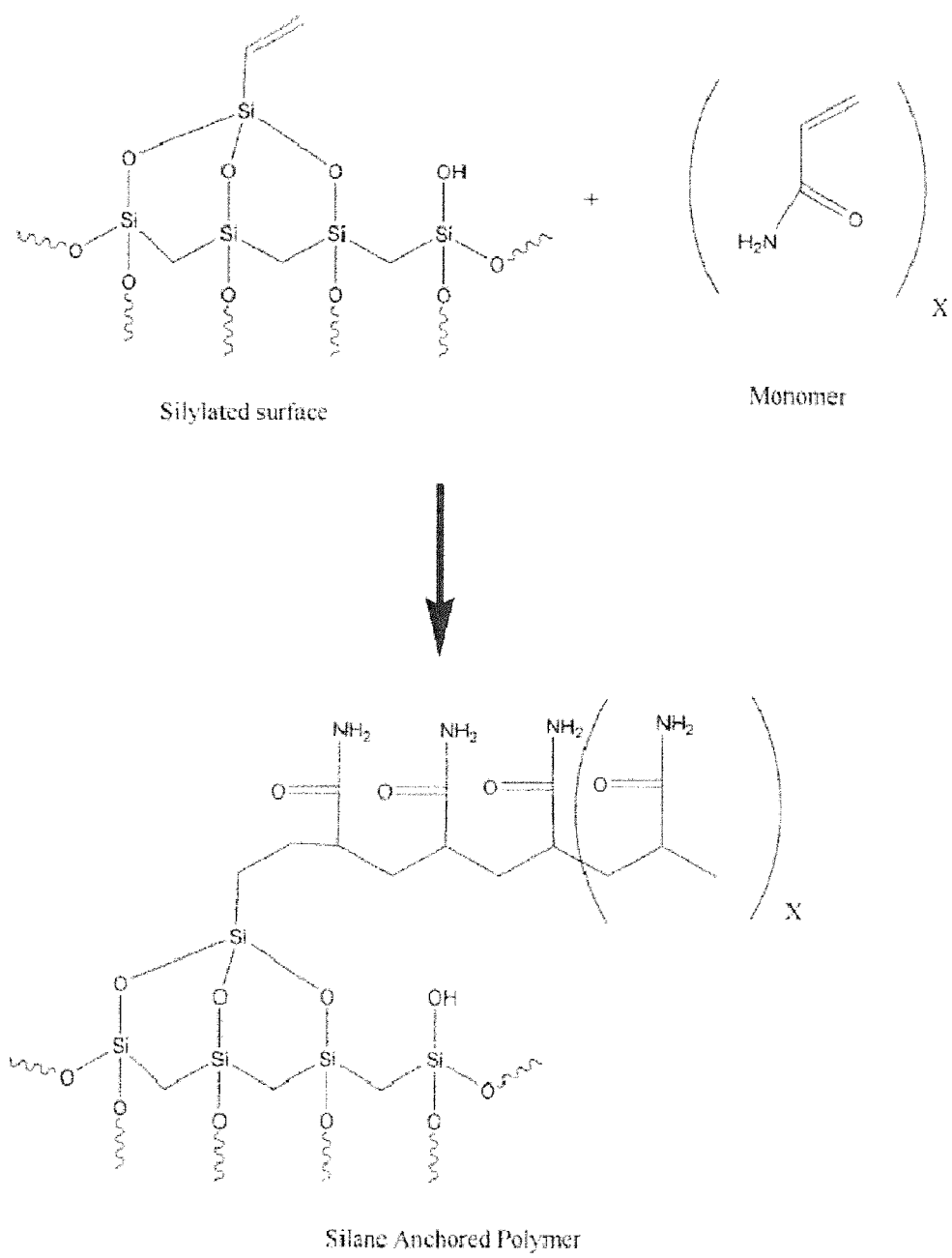
FIG. 2 is an example of a silylated surface having a vinyl group copolymerizing with a monomer (for example, acrylamide) to provide a silane-anchored polymer (for example, a silane anchored polyacrylamide).

While the methods of the present inventions are useful in a variety of well completion and remedial operations, they are particularly useful in consolidating an unconsolidated subterranean formation, in the stabilization of fines, or in consolidating a proppant or gravel pack previously placed in a subterranean formation.

In describing and claiming the present invention, the following terminology will be used.

The words "comprise," "have," "include," and all grammatical variations thereof are each intended to have an open, non-limiting meaning that does not exclude additional elements or steps.

"In place" means naturally located in a portion of a well or previously placed in a portion of a well. For example, mineral materials naturally occurring in a subterranean formation of the near-wellbore region is "in place" in a portion of the well. Similarly, previously deposited proppant in a subterranean formation of the near-wellbore region is "in place" in a portion of the well.

An example of a surface of a mineral having dangling hydroxyl groups is sand. As used herein, "sand" is a particulate comprising a silicate, especially silica (silicon dioxide), which, in sand, is usually in the form of quartz. A silicate surface usually has at least some surface density of dangling hydroxyl groups. Hydroxyl groups on silicon atoms, as in silica, sometimes are referred to as silanol groups. The chemistry of a mineral surface having dangling hydroxyl groups includes the hydrogen-bonding and other chemical reactivity of the dangling hydroxyl groups.

As used herein, "soluble" in a solvent or solvent mixture means that at least 2% by weight of a chemical compound or substance can be dissolved in a solvent at a temperature of 77° F. As used herein, water-soluble or soluble in water means in de-ionized water.

The words "first," "second," and "third" are assigned arbitrarily and are merely intended to differentiate between the possibility of two or more chemical compounds, functional groups, conditions, etc., as the case may be, and do not have any other significance and do not indicate any sequence. Furthermore, it is to be understood that the mere use of the term "first" does not require that there be any "second," and the mere use of the word "second" does not require that there be any "first" or any "third," etc.

As used herein, "polymer" means a homopolymer or a copolymer. The word "copolymer" means and includes a copolymer, terpolymer, etc. formed of two or more monomers.

The word "lower," when referring to organic compounds or functional groups (when not otherwise specified), means containing from one to five carbons. For example, a lower alcohol can include methanol, ethanol, propanol, iso-propanol, etc.; a lower alkoxy can include methoxy, ethoxy, propoxy, etc.; and lower alkyl can include methyl, ethyl, propyl, isopropyl, butyl, isobutyl, etc.

According to one aspect of the inventions, a method of treating a portion of a well is provided, the method comprising the steps of: (a) introducing a water-soluble monomer into the portion of the well, wherein the water-soluble monomer comprises a first polymerizable group, wherein the water-soluble monomer is polymerizable to form a water-soluble polymer; (b) introducing an anchoring agent into the portion of the well, wherein the anchoring agent comprises a hydrolyzable silyl group and a second polymerizable group, and wherein the first polymerizable group and the second polymerizable group are the same or different and are copolymerizable; (c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent; (d) allowing or causing a second condition in the portion of the well that is at least sufficient for the first polymerizable group and the second polymerizable group to copolymerize; and (e) allowing or causing a third condition in the portion of the well that is at least sufficient for the first polymerizable group to polymerize; wherein any two of the first condition, the second condition, and the third condition can be the same or different.

According to another aspect of the inventions, a method for treating a portion of a well is provided, the method comprising the steps of: (a) introducing a water-soluble monomer into the portion of the well, wherein the water-soluble monomer comprises a polymerizable group, wherein the water-soluble monomer is polymerizable to form a water-soluble polymer, wherein the water-soluble monomer comprises a first organo-reactive group; (b) introducing an anchoring agent into the portion of the well, wherein the anchoring agent comprises a hydrolyzable silyl group and a second organo-reactive group, and wherein the first organo-reactive group and the second organo-reactive group are the same or different and are capable of being reacted with each other to form a covalent bond; (c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent; (d) allowing or causing a second condition in the portion of the well that is at least sufficient for the first organo-reactive group and the second organo-reactive group to react with each other to form a covalent bond; and (e) allowing or causing third conditions in the portion of the well that are at least sufficient for the polymerizable group to polymerize; wherein any two or three of the first condition, the second condition, and the third condition can be the same or different.

It is believed that methods according to the inventions are capable of polymerizing a water-soluble monomer to form a water-soluble polymer in a portion of a well. In addition, the polymer is covalently bonded to a silylated mineral surface in the portion of the well, wherein the mineral is in-place in the portion of the well prior to at least the step of introducing the anchoring agent. The methods are expected to produce monomolecular layers of polymer bonded to the mineral surfaces of the matrix. Such monomolecular layers of polymer bonded to the mineral surfaces of the matrix are expected to provide excellent elastic properties to the matrix without interfering with matrix permeability.

According to a preferred embodiment of either aspect of the inventions, the portion of the well to be treated is a near-wellbore region of the well. For example, the mineral in-place in the portion of the well can be a proppant previously placed in the near-wellbore region of the well. By way of another example, the mineral in-place in the portion of the well can be naturally occurring in the near-wellbore region of the well. An example of a treatment of a portion of well wherein the mineral is naturally occurring in the well is a formation consolidation treatment. An example of a type of mineral that can be in-place in the well is silica.

Preferably, the first polymerizable group of the water-soluble monomer is stable to hydrolysis under the first condition. More preferably, the water-soluble monomer, as a whole, is stable to hydrolysis under the first condition.

Preferably, the first polymerizable group comprises an aliphatic unsaturation. More preferably, the first polymerizable group is a vinyl group.

The water-soluble monomer can be selected from the group consisting of an acrylamide, an acrylate, an acrylic acid, a vinyl ether, a vinyl alcohol, a vinyl pyrrolidone, and a vinyl sulfonate. For example, the water-soluble monomer can be selected from the group consisting of acrylamide ("AM"), hydroxylethylacrylamide, acrylate, methacrylate, and methacrylic acid. Other examples include N-hydroxymethylacrylamide ("HMAA"), hydroxyethylacrylate ("HEA"), hydroxyethylmethacrylate ("HEMA"), and N-hydroxymethylmethacrylamide ("HMMAA"). The water-soluble monomer can be selected from a variety of hydrophilic monomers and hydrophobically-modified hydrophilic monomers. Examples of particularly suitable hydrophilic monomers which can be utilized include, but are not limited to, acrylamide ("AM"), 2-acrylamido-2-methyl-1-propane sulfonic acid ("AMPS"), N,N-dimethylacrylamide, vinyl pyrrolidone, dimethylaminoethyl methacrylate, acrylic acid, dimethylaminopropylmethacrylamide, trimethylammoniurnethyl methacrylate chloride, methacrylamide, and hydroxyethyl acrylate. Particularly suitable hydrophobically-modified hydrophilic monomers include, but are not limited to, alkyl acrylates, alkyl methacrylates, alkyl acrylamides, and alkyl methacrylamides wherein the alkyl radicals have from about 4 to about carbon atoms, alkyl dimethylammoniumethyl methacrylate bromide, alkyl dimethylammoniumethyl methacrylate chloride and alkyl dimethylammoniumethyl methacrylate iodide wherein the alkyl radicals have from about 4 to about 22 carbon atoms and alkyl dimethylammonium-propylmethacrylamide bromide, alkyl dimethylammonium propylmethacrylamide chloride and alkyl dimethylammonium-propylmethacrylamide iodide wherein the alkyl groups have from about 4 to about 22 carbon atoms.

In general, it is contemplated that the step of introducing a water-soluble monomer further can include the step of introducing more than one water-soluble monomer, wherein the water-soluble monomers are copolymerizable with each other under the third condition. Preferably, the step of introducing the more than one water-soluble monomers produces a proportion of the monomers in the portion of the well that is capable of forming a water-soluble copolymer. This can be inferred by laboratory testing of the expected concentrations and proportions under the third condition (and in the absence of a surface that can be silylated by the anchoring agent).

The reactivity of the hydrolyzable silyl group of the anchoring agent can be use to form a covalent bond to an inorganic surface of an in-place mineral having dangling hydroxyl groups, such as a silica surface. The anchoring agent preferably is a monosilane, although it is contemplated that other silanes can be employed in the inventions, such as a disilane or trisilane, etc. The anchoring agent preferably is hydrolyzable to a water-soluble chemical intermediate under the first condition. The hydrolyzable silyl group can be a mono-, di-, or tri-hydrolyzable silyl group. A tri-hydrolyzable silyl group presently is preferred. The hydrolyzable silyl group is preferably —$SiR_3$, wherein each R is independently selected from the group consisting of a lower alkoxy, a lower acyloxy, hydrogen, and halide. Most preferably, each R is independently selected from the group consisting of a lower alkoxy and a lower acyloxy. According to the presently most-preferred embodiments, the hydrolyzable silyl group is selected from the group consisting of trimethoxy silyl, triethoxy silyl, and tripropoxy sily. In addition, polyhedral oligomeric silsequioxanes can be used as anchoring agents.

According to a first aspect of the inventions, the anchoring agent has a second polymerizable group, wherein the first polymerizable group of the water-soluble monomer and the second polymerizable group of the anchoring agent are the same or different and are copolymerizable. Preferably, the second polymerizable group of the anchoring agent is stable to hydrolysis under the first condition. Preferably, the second polymerizable group comprises an aliphatic unsaturation. According to a presently most preferred embodiment, the second polymerizable group is a vinyl group.

The hydrolyzable silyl group and the second polymerizable group of the anchoring agent can be directly attached to one another or indirectly attached to one another through one or more covalent bonds of a molecular structure of the anchoring group.

Examples of an anchoring agent that can be utilized in the first aspect of the inventions include, but are not limited to, trimethoxy(vinyl)silane and triethoxy(vinyl)silane.

It is contemplated that the step of introducing the anchoring agent further can include the step of introducing more than one anchoring agent, wherein the one or more water-soluble monomers and the anchoring agents are copolymerizable.

According to the first aspect of the inventions, the step of introducing one or more water-soluble monomers and the step of introducing one or more anchoring agents preferably produces a proportion of the water soluble monomers and the anchoring agents in the portion of the well that is capable of forming a water-soluble copolymer. This can be inferred by laboratory testing of the expected concentrations and proportions under the second condition of copolymerization (and in the absence of a surface that can be silylated by the anchoring agent).

According to a second aspect of the inventions, the water-soluble monomer comprises a first organo-reactive group and the anchoring agent comprises a second organo-reactive group, wherein the first organo-reactive group and the second organo-reactive group are the same or different and are capable of being reacted with each other to form a covalent bond. Preferably, the covalent bond to be formed is a carbon-carbon bond. As used herein, an "organo-reactive group" is a functional group having affinity for reacting chemically with an organic group. The first organo-reactive group and the second organo-reactive group are reactive in a manner that is different from the first polymerizable group and the second polymerizable group being copolymerizable. The first organo-reactive group and the second organo-reactive group can be, but need not be, copolymerizable under the second condition of reacting to form a covalent bond.

Preferably, each of the first organo-reactive group and the second organo-reactive group is stable to hydrolysis under the first condition.

According to preferred embodiments, for example, the first organo-reactive group comprises a vinyl, epoxy, or amino group; and the second organo-reactive group comprises a vinyl, epoxy, or amino group.

The hydrolyzable silyl group and the second organo-reactive group of the anchoring agent can be directly attached to one another or indirectly attached to one another through one or more covalent bonds of a molecular structure of the anchoring group.

Examples of an anchoring agent that can be utilized in the second aspect of the inventions include, but are not limited to, N-2-(aminoethyl)-3-aminopropyltrimethoxysilane, 3-glycidoxypropyltrimethoxysilane, and n-beta-(aminoethyl)-gamma-aminopropyl trim ethoxysilane.

As described above, it is contemplated that the step of introducing a water-soluble monomer can further include the step of introducing more than one water-soluble monomer, wherein the water-soluble monomers are copolymerizable with each other under the third condition.

According to the second aspect of the invention, it is contemplated that the step of introducing the anchoring agent can further include the step of introducing more than one anchoring agent, wherein each anchoring agent is selected to react with at least one of the one or more water-soluble monomers introduced in the method.

In general regarding either aspect of the inventions, preferably the step of introducing the water-soluble monomer comprises introducing the water-soluble monomer in a non-aqueous fluid in which the water-soluble monomer is soluble. More preferably, the non-aqueous fluid is substantially free of water (dry). According to a presently most-preferred embodiment, the non-aqueous fluid comprises one or more lower alcohols. Similar preferences apply if the step of introducing the water-soluble monomer comprises introducing more than one water-soluble monomer.

The silylation of a mineral surface having dangling hydroxyl groups can occur in a liquid phase. There may be a sufficient amount of water on the surface of the mineral for the hydrolysis of the silyl group adjacent the surface. It is believed that at least some of the hydrolyzed silyl group can then undergo a condensation reaction to covalently bond with a dangling hydroxyl group of the mineral surface. The presence of water in the carrier fluid for introducing the anchoring agent into the portion of the well, however, can cause the hydrolyzable silyl group to undergo hydrolysis and a condensation reaction before adsorption onto a mineral surface in the portion of the wellbore.

In general regarding either aspect of the inventions, the step of introducing the anchoring agent preferably comprises introducing the anchoring agent in a non-aqueous fluid in which the anchoring agent is soluble. More preferably, the non-aqueous fluid is substantially free of water (dry). According to a presently most-preferred embodiment, the non-aqueous fluid comprises one or more lower alcohols. Similar preferences apply if the step of introducing the anchoring agent comprises introducing more than one anchoring agent.

In general, the step of introducing the anchoring agent is preferably simultaneous with or after the step of introducing the water-soluble monomer. Most preferably, these steps are performed simultaneously. The step of introducing the water-soluble monomer can be prior to the step of introducing the anchoring agent, but it is believed that it is preferable to start the silylation of the mineral surface prior to, or simultaneously with, the polymerization to maximize the benefits of the present inventions.

In general, the first condition for the silylation of the mineral surface in the portion of the well preferably comprises the presence of water for the hydrolyzable silyl group to at least partially silylate the mineral surface. Alternatively, a small concentration of water can be included in the fluid used in the step of introducing the anchoring agent. Preferably, the source of the water is naturally present in the portion of the well. The pH of the water present for the silylation reaction is preferably is adjusted to promote the desired condensation reaction on the surface of the silica.

The first condition preferably comprises at least a sufficient concentration of the anchoring agent to be capable of bonding at least some of water-soluble polymer to a mineral surface. In some embodiments of the present invention, the anchoring agent used is included in a concentration in the range of from about 0.1% to about 3% by weight of the water-soluble monomer.

According to the first aspect of the inventions, the second condition for copolymerization preferably comprises the presence of a copolymerization catalyst to help the first polymerizable group and the second polymerizable group to copolymerize. According to a more-preferred embodiment of this aspect of the inventions, the copolymerization catalyst is a free-radical catalyst. For example, the free-radical catalyst or polymerization initiator employed herein can be any suitable water-soluble compound or compounds which form free radicals in aqueous solution. Such compounds include, but are not limited to, alkali metal persulfates, such as, sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper (I), Iron(II), chlorite and hydrogen peroxide. Azo polymerization initiators are also useful herein and are preferred, as discussed in U.S. Pat. No. 5,358,051 issued Oct. 25, 1994, which is incorporated by reference in its entirety. The most preferred azo compounds for use herein are 2,2'Azobis (N,N'-dimethylene isobutyramidine)dihydro-chloride, referred to herein as initiator I-44; 2,2'-Azobis(2-amidinopropane) dihydrochloride, referred to herein as initiator I-50; and 2,2'-Azobis[2-methyl-N-(2-hydroxethyl)propionamide], referred to herein as initiator 1-86.

According to the second aspect of the inventions, the second condition for the reaction of first organo-reactive group and the second organo-reactive group preferably comprises the presence of a reaction catalyst for the first organo-reactive group and the second organo-reactive group to react with each other to form a covalent bond. For polymerizing a vinyl group, a reaction catalyst would typically be a free-radical.

In general, the third condition comprises the presence of a polymerization catalyst for the first polymerizable group to polymerize. According to a more-preferred embodiment of this aspect of the inventions, the polymerization catalyst is a free-radical catalyst. For example, the free-radical catalyst or polymerization initiator employed herein can be any suitable water-soluble compound or compounds which form free radicals in aqueous solution. Such compounds include, but are not limited to, alkali metal persulfates, such as, sodium persulfate, potassium persulfate and ammonium persulfate; peroxides, such as hydrogen peroxide and tertiary-butyl hydroperoxide; oxidation-reduction systems employing reducing agents, such as, bisulfite, sulfite, thiosulfate and metabisulfite in combination with oxidizers such as silver(I), copper (I), Iron(II), chlorite and hydrogen peroxide. Azo polymerization initiators are also useful herein and are preferred, as discussed in U.S. Pat. No. 5,358,051 issued Oct. 25, 1994, which is incorporated by reference in its entirety. The most preferred azo compounds for use herein are 2,2'Azobis(N,N'-dimethylene isobutyramidine)dihydro-chloride, referred to herein as initiator I-44; 2,2'-Azobis(2-amidinopropane)dihydrochloride, referred to herein as initiator I-50; and 2,2'-Azobis[2-methyl-N-(2-hydroxethyl)propionamide], referred to herein as initiator 1-86. It should be understood, of course, that, according to the first aspect of the inventions, the polymerization catalyst can be the same as or different from the copolymerization catalyst. Most preferably, the copolymerization catalyst and the polymerization catalyst are the same.

In general, the steps of allowing or creating the first condition, the second condition, and the third condition can be performed in any practical sequence, including any two simultaneously or all three simultaneously.

In general, the methods further include the step of producing fluid from the portion of the well. According to an object and advantage of the present inventions, the polymer formed in the portion of the well is anchored to a downhole mineral surface, which helps consolidate the matrix or particulate in the well and resists the polymer washing off from the mineral surface.

Therefore, the present inventions are well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is, therefore, evident that the particular illustrative embodiments disclosed above may be altered or modified, and all such variations are considered within the scope and spirit of the present invention. While compositions and methods are described in terms of "comprising," "containing," or "including" various components or steps, the compositions and methods also can "consist essentially of" or "consist of" the various components and steps. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a to b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an", as used in the claims, are defined herein to mean one or more than one of the element that it introduces. If there is any conflict in the usages of a word or term in this specification and one or more patent(s) or other documents that may be incorporated herein by reference, the definitions that are consistent with this specification should be adopted.

What is claimed is:

1. A method of treating a portion of a well, the method comprising the steps of:
   (a) introducing a water-soluble monomer into the portion of the well,
      wherein the water-soluble monomer comprises a first polymerizable group, and
      wherein the water-soluble monomer is polymerizable to form a water-soluble polymer;
   (b) introducing an anchoring agent into the portion of the well,
      wherein the anchoring agent comprises a hydrolyzable silyl group and a second polymerizable group, and
      wherein the first polymerizable group and the second polymerizable group are the same or different and are copolymerizable;
   (c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;
   (d) allowing or causing a second condition in the portion of the well that is at least sufficient for the first polymerizable group and the second polymerizable group to copolymerize; and
   (e) allowing or causing a third condition in the portion of the well that is at least sufficient for the first polymerizable group to polymerize;
   wherein any two of the first condition, the second condition, and the third condition can be the same or different;
      wherein the step of introducing the water-soluble monomer comprises introducing the water-soluble monomer in a non-aqueous fluid in which the water-soluble monomer is soluble.

2. A method of treating a portion of a well, the method comprising the steps of:
   (a) introducing a water-soluble monomer into the portion of the well,
      wherein the water-soluble monomer comprises a first polymerizable group, and
      wherein the water-soluble monomer is polymerizable to form a water-soluble polymer;
   (b) introducing an anchoring agent into the portion of the well,
      wherein the anchoring agent comprises a hydrolyzable silyl group and a second polymerizable group, and
      wherein the first polymerizable group and the second polymerizable group are the same or different and are copolymerizable;
   (c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;
   (d) allowing or causing a second condition in the portion of the well that is at least sufficient for the first polymerizable group and the second polymerizable group to copolymerize; and (e) allowing or causing a third condition in the portion of the well that is at least sufficient for the first polymerizable group to polymerize;

wherein any two of the first condition, the second condition, and the third condition can be the same or different;

wherein the step of introducing the anchoring agent comprises introducing the anchoring agent in a non-aqueous fluid in which the anchoring agent is soluble.

3. A method of treating a portion of a well, the method comprising the steps of:

(a) introducing a water-soluble monomer into the portion of the well, wherein the water-soluble monomer comprises a first polymerizable group, wherein the water-soluble monomer is polymerizable to form a water-soluble polymer, and wherein the water-soluble monomer comprises a first organo-reactive group;

(b) introducing an anchoring agent into the portion of the well, wherein the anchoring agent comprises a hydrolyzable silyl group and a second organo-reactive group, and wherein the first organo-reactive group and the second organo-reactive group are the same or different and are capable of being reacted with each other to form a covalent bond;

(c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;

(d) allowing or causing a second condition in the portion of the well that is at least sufficient for the first organo-reactive group and the second organo-reactive group to react with each other to form a covalent bond; and (e) allowing or causing a third condition in the portion of the well that is at least sufficient for the first polymerizable group to polymerize;

wherein any two or three of the first condition, the second condition, and the third condition can be the same or different;

wherein the step of introducing the water-soluble monomer comprises introducing the water-soluble monomer in a non-aqueous fluid in which the water-soluble monomer is soluble.

4. A method of treating a portion of a well, the method comprising the steps of:

(a) introducing a water-soluble monomer into the portion of the well, wherein the water-soluble monomer comprises a first polymerizable group, wherein the water-soluble monomer is polymerizable to form a water-soluble polymer, and wherein the water-soluble monomer comprises a first organo-reactive group;

(b) introducing an anchoring agent into the portion of the well, wherein the anchoring agent comprises a hydrolyzable silyl group and a second organo-reactive group, and wherein the first organo-reactive group and the second organo-reactive group are the same or different and are capable of being reacted with each other to form a covalent bond;

(c) allowing or causing a first condition in the portion of the well that is at least sufficient for the hydrolyzable silyl group to at least partially silylate a surface of a mineral having dangling hydroxyl groups, wherein the mineral is in-place in the portion of the well prior to the step of introducing the anchoring agent;

(d) allowing or causing a second condition in the portion of the well that is at least sufficient for the first organo-reactive group and the second organo-reactive group to react with each other to form a covalent bond; and (e) allowing or causing a third condition in the portion of the well that is at least sufficient for the first polymerizable group to polymerize;

wherein any two or three of the first condition, the second condition, and the third condition can be the same or different;

wherein the step of introducing the anchoring agent comprises introducing the anchoring agent in a non-aqueous fluid in which the anchoring agent is soluble.

* * * * *